United States Patent [19]

Ignarra et al.

[11] Patent Number: 5,863,089
[45] Date of Patent: Jan. 26, 1999

[54] VEHICLE CONSOLE HAVING ROTATABLY MOUNTED CUP HOLDER AND HINGED STORAGE TRAY

[75] Inventors: Ricardo Ignarra, Huntington Beach; Daniel Whitaker, Santa Ana, both of Calif.

[73] Assignee: Covercraft Industries, Inc., Pauls Valley, Okla.

[21] Appl. No.: 743,406

[22] Filed: Nov. 1, 1996

[51] Int. Cl.[6] .................................. B60R 7/00; B60N 3/12
[52] U.S. Cl. ....................... 296/37.8; 296/37.12; 209/926
[58] Field of Search .............................. 296/37.12, 37.8; 224/926, 539, 281

[56] References Cited

U.S. PATENT DOCUMENTS

| | | | |
|---|---|---|---|
| 4,423,812 | 1/1984 | Sato | 296/37.12 X |
| 4,809,897 | 3/1989 | Wright, Jr. | 224/539 X |
| 5,072,989 | 12/1991 | Spykerman et al. | 296/37.8 X |
| 5,085,481 | 2/1992 | Fluharty et al. | 296/37.8 |
| 5,289,962 | 3/1994 | Tull et al. | 296/37.12 X |
| 5,326,064 | 7/1994 | Sapien | 224/926 X |
| 5,337,984 | 8/1994 | Houck | 224/281 X |
| 5,520,313 | 5/1996 | Toshihide | 296/37.12 X |
| 5,680,974 | 10/1997 | Vander Sluis | 224/926 X |

FOREIGN PATENT DOCUMENTS

| | | | |
|---|---|---|---|
| 357164821 | 10/1982 | Japan | 224/926 |
| 403276832 | 12/1991 | Japan | 296/37.8 |
| 405050876 | 3/1993 | Japan | 296/37.8 |
| 401112181 | 5/1993 | Japan | 296/37.8 |
| 405139199 | 6/1993 | Japan | 296/37.8 |
| 405213105 | 8/1993 | Japan | 296/37.8 |

*Primary Examiner*—Joseph D. Pape
*Attorney, Agent, or Firm*—Pillsbury Madison & Sutro LLP

[57] ABSTRACT

An automotive vehicle console has a hinged lid covering a storage compartment formed within a hollow housing, a pair of cup holders disposed forwardly of and rearwardly of the storage compartment, and a sunglass holder cavity at a forward portion of the console. Each cup holder is of integral, one-piece construction and is rotatably mounted within the hollow interior of the housing. The cup holder is rotatable between a closed position in which a door attached to the cup holder is generally continuous with the outer surface of the housing and an open position in which a side-by-side pair of rigid, continuously fully-opened cup receptacles are positioned for use. Each cup receptacle comprises a stepped opening of circular configuration in which a slot in a circumferential portion of the upper edge thereof accommodates the handle of a cup placed therein. The stepped opening includes an upper portion of given diameter and a lower connecting portion of diameter smaller than the given diameter, to accommodate a variety of cups of different sizes. Momentary pushing of the cup holder door releases a catch assembly within the housing, allowing a spring coupled between the door and a fixed reference point to rotate the cup holder into the open position. A hinged storage tray mounted at the top of the storage compartment and sharing a common hinge with the lid has a side edge thereof opposite the hinge which is coupled to a releasable latch assembly at a side edge of the hinged lid, allowing the tray to remain at the top of the storage compartment with the interior thereof exposed, as the hinged lid is raised, or raising the tray up with the hinged lid to expose the interior of the storage compartment below the tray. The storage tray is specially configured to store commonly used objects such as a phone, a tissue box, a note pad and a pen or pencil.

15 Claims, 8 Drawing Sheets

5,863,089

VEHICLE CONSOLE HAVING ROTATABLY MOUNTED CUP HOLDER AND HINGED STORAGE TRAY

BACKGROUND OF THE INVENTION

1. Field of the Invention

The present invention relates to automotive vehicle consoles, and more particularly to consoles having cup holders, storage compartments and other convenience features.

2. History of the Prior Art

It is well known to provide automotive vehicles with a console. Consoles are typically located at the front of the vehicle and divide the front seating area between the driver's side and the passenger's side. Such consoles are usually provided with one or more storage compartments therein for storage of miscellaneous items such as tapes, compact discs, a cellular telephone, and the like. A hinged lid may control access to the compartment, or the compartment may be open.

Many automotive vehicle consoles are provided with a cup holder designed to securely hold one or more cups so that they do not have to be continuously held by the driver or passenger. Cup holders may be of the permanently exposed type, or they may be the disappearing type which is opened for use by the operator when desired. The disappearing type is preferred because they enhance the appearance of the console when not in use. Disappearing type cup holders have various mechanisms for allowing them to move between closed and open positions. Often they are provided with a door which is generally continuous with the outer surface of the console housing when the cup holder is in the closed position. An operator selectively opens the door so that the cup holder mechanism is moved into the open position in preparation for use.

Conventional cup holders employ a variety of different motion mechanisms, including those which undergo sliding motion and those which pivot or rotate. Unfortunately, most such cup holders must rely upon a complicated motion mechanism for opening the cup receiving receptacles as the cup holder moves into the open position. This adds considerably to the expense of the cup holder mechanism, and further comprises a source of trouble as the automotive vehicle begins to age.

Most automotive vehicle consoles have one or more storage compartments therein, as previously noted. Typically, there is one large storage compartment at the center of the console, access to which is controlled by a hinged lid at the top thereof. The hinged lid may be padded so as to serve as an armrest, or it may be configured to hold objects placed thereon. While such storage compartments tend to be large enough to hold a variety of different objects, their inability to provide much organization often makes it difficult for the driver or passenger to find a particular object stored therein. A mixture of objects such as tapes, compact discs, pencils and other such objects makes it difficult to retrieve a particular object when desired.

Accordingly, it would be desirable to provide an automotive vehicle console having a disappearing cup holder of relatively simple configuration which eliminates the need for complicated mechanisms to open the cup-receiving receptacles as the cup holder is moved into the open position. Preferably, the cup holder should include rigid, continuously fully opened cup receptacles. It would also be desirable to provide cup receptacles configured to receive and support a variety of cups of different sizes, and particularly to have the facility to accommodate the handle of certain cups such as coffee cups. Often, with cups that have handles, the handle gets in the way, making it difficult to place the cup securely within the cup holder. It would also be desirable to provide an automotive vehicle console in which the storage compartment thereof is arranged so as to be capable of storing a variety of different objects in organized fashion. Such arrangement would desirably conserve on space by providing for object storage at different levels within the console, while at the same time making access to the different levels of storage relatively easy.

BRIEF SUMMARY OF THE INVENTION

The foregoing objects, features and advantages are achieved by an automotive vehicle console having an improved cup holder arrangement and an improved storage compartment arrangement. Improved cup holder arrangements according to the invention utilize a cup holder with a plurality of rigid, continuously fully-opened cup receptacles, so that complicated mechanisms for opening such cup receptacles during movement into the open position are eliminated. The cup holder is pivotably or rotatably mounted within the hollow housing of the console, and preferably is of integral, one-piece constructions for reasons of simplicity and economy. A hinged lid is mounted above and provides access to the main storage compartment for the console. To enhance both the storage capacity and the ability to organize objects stored in the compartment, a hinged compartment, just below the hinged lid. The tray is arranged to neatly store a variety of different objects therein in organized fashion. An edge of the tray is releasably coupled by a latch assembly to the underside of the hinged lid. By pressing a button to release the latch, the tray remains at the upper open end of the storage compartment as the hinged lid is raised, providing access to the interior of the tray. Alternatively, when the latch is not released, raising of the hinged lid carries the tray with it, to provide access to lower portions of the storage compartment where other objects may be stored.

In a preferred arrangement of a cup holder according to the invention, the cup holder is pivotally or rotatably mounted within the hollow interior of the housing for the console and has a door coupled thereto which is generally continuous with the outer surface of the housing when the cup holder is in the closed position. Momentary pushing of the door by the operator releases a catch assembly at the inside of the hollow housing and allows a spring coupled between the door and a fixed reference point inside the housing to pivot the cup holder into the open position. There, the cup holder is held by engagement of the door with an edge of the outer surface of the housing and engagement of an extending portion of the releasable catch assembly with an opposite edge of the outer surface of the housing. As the cup holder rotates into the open position, there is no need to open the cup receptacles. The receptacles are of rigid, continuously fully-opened construction. Preferably, the entire cup holder is of integral, molded, one-piece construction.

In cup holders according to the invention, the cup receptacles comprise stepped openings of circular configuration, having an upper portion of given diameter connecting to a lower portion of diameter smaller than the given diameter. This provides for accommodation of a variety of cups of different sizes and diameters. The stepped opening has an upper edge of circular configuration with a slot in a circumferential portion thereof for receiving the lower portion of the handle of a cup. This permits cups having handles to be securely placed in the cup receptacles.

In a preferred embodiment of an automotive vehicle console having a hinged storage tray, the tray is provided with an outwardly extending peripheral lip portion which rests upon ledges to mount the tray at the upper open end of the storage compartment. The hinged lid has a side edge thereof coupled by an elongated hinge to the ledge at the upper end of one of the side walls. The elongated hinge also couples a side of the tray to the ledge. When the lid is in the closed position, a releasable latch at the opposite side edge of the lid engages a latch receiving slot in the outwardly extending peripheral lip portion of the tray. When the hinged lid is raised, the storage tray which is coupled to the underside thereof by the releasable latch raises with the lid to expose the interior of the storage compartment. This provides access to the storage compartment which, in the preferred example may include a tape and compact disc storage compartment at a forward end thereof and an ice bucket trough at the major rearward portion thereof. Alternatively, the hinged lid may be raised without lifting the storage tray by pushing a tray release button at the side of the releasable latch. This pushes the resilient latch into a position whereby the latch clears the latch receiving slot in the outwardly extending peripheral lip portion of the storage tray, as the hinged lid is raised. This provides access to the inside of the storage tray.

In a preferred embodiment thereof, the hinged storage tray is of elongated rectangular configuration, and has a relatively uniform depth throughout a major portion thereof. A first side of the tray interior is designed to store a cellular phone therein, and has a shelf at a forward end thereof for supporting a portion of the phone and a knockout plug in the bottom of the tray toward the rear thereof for accommodating a cord for the phone. The rear portion of an opposite second side of the tray interior is configured to receive and store therein a tissue box. A tab extends from the rear wall of the tray to define a limit position for the tissue box. A raised portion of the tray interior at the forward end of the second side is surrounded by a wall and is configured to store a notepad therein. An elongated groove extends across a forward portion of the tray at the peripheral lip portion to define a holder for a pen, pencil or other writing implement. A slot in a side portion of the peripheral lip portion receives the latch so that the tray may be releasably attached to the bottom of the hinged lid.

BRIEF DESCRIPTION OF THE DRAWINGS

The foregoing and other objects, features and advantages of the invention will be apparent from the following more particular description of preferred embodiments of the invention, as illustrated in the accompanying drawings, in which.

DETAILED DESCRIPTION

Figure 1:
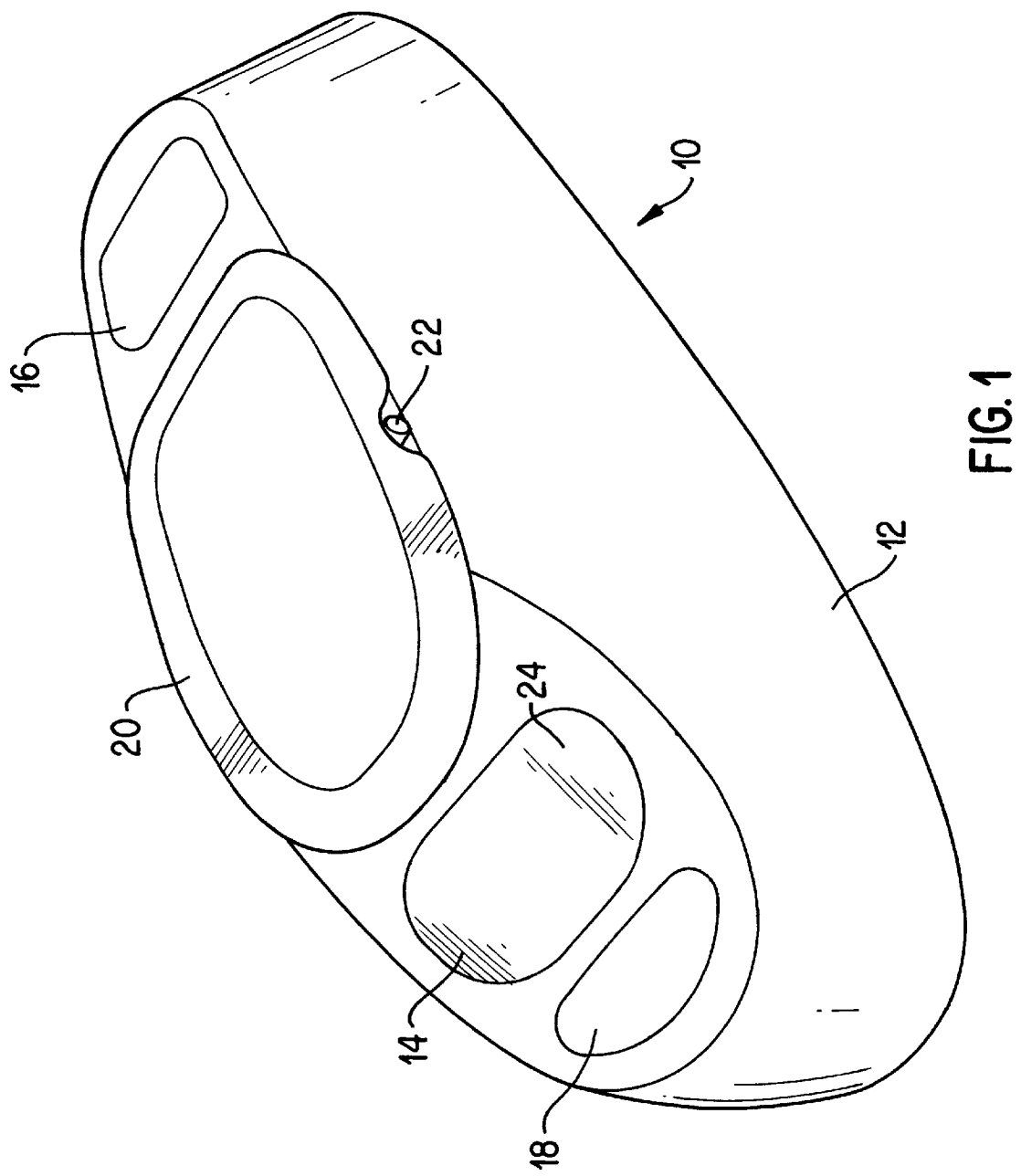
FIG. 1 is a perspective view of an automotive vehicle console having a rotatably mounted cup holder and a hinged storage tray at the top of the storage compartment, in accordance with the invention.

FIG. 1 shows an automotive vehicle console 10 in accordance with the invention. The console 10 has a hollow housing 12 of elongated configuration which defines the general shape of the console 10. The console 10 includes a forward cup holder 14 and a rearward cup holder 16. The cup holders 14 and 16 are of identical construction, and only the forward cup holder 14 is described hereafter. A cavity which is forward of the forward cup holder 14 defines a sunglass holder 18. The console 10 has a storage compartment in a central portion thereof, which is described in detail hereafter. A hinged lid 20 which covers the top of the storage compartment can be raised to provide access to the storage compartment. Pressing of a tray release button 22 at a side edge of the hinged lid 20 releases the hinged lid 20 from a hinged storage tray mounted thereunder so as to provide access to the storage tray instead of to the storage compartment when the hinged lid 20 is raised, as described hereafter.

Figure 2:
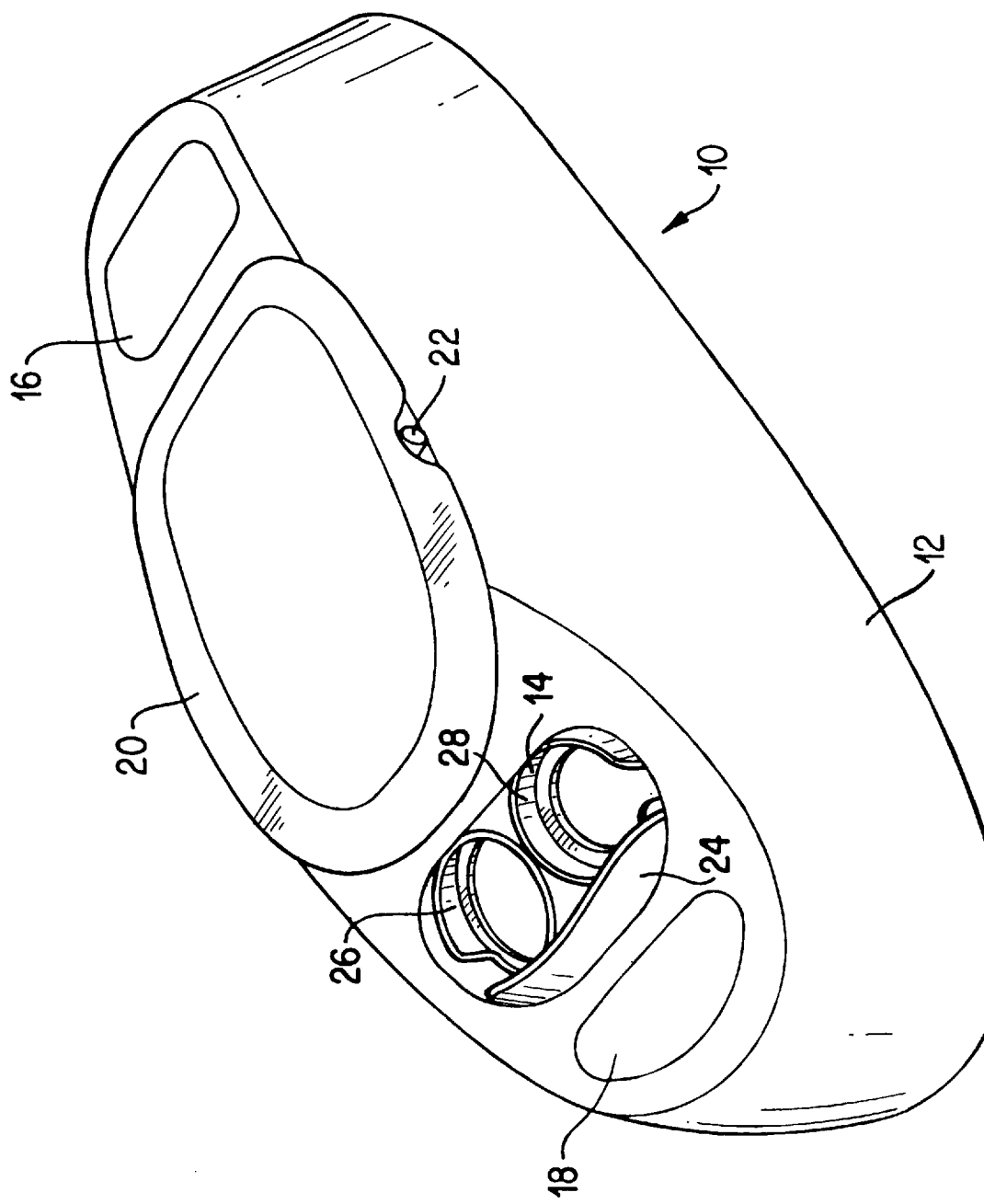
FIG. 2 is a perspective view of the automotive vehicle console of FIG. 1, showing a forward cup holder thereof in the open position.
Figure 3:
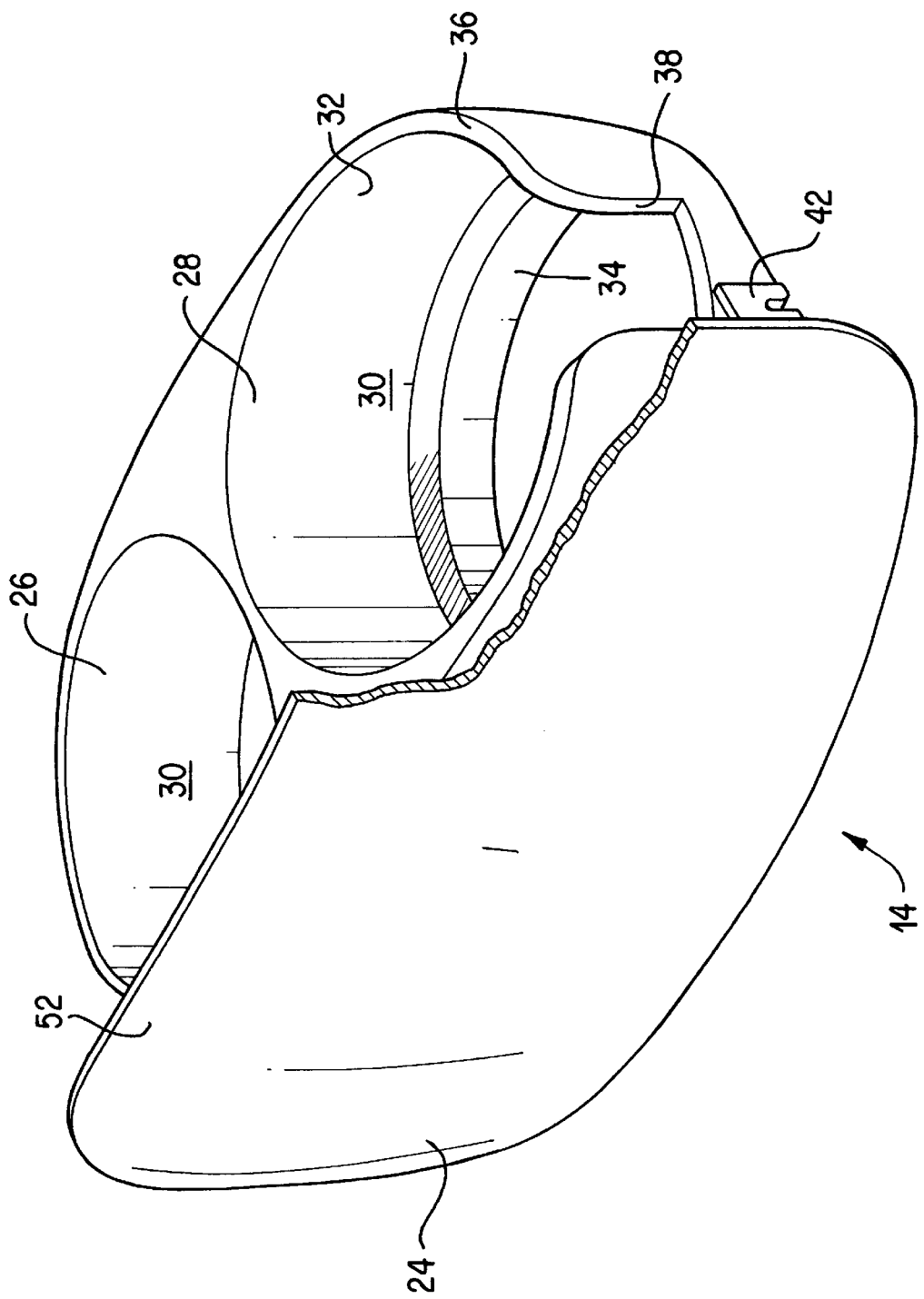
FIG. 3 is a perspective view of the forward cup holder of the console of FIG. 1.
Figure 4:
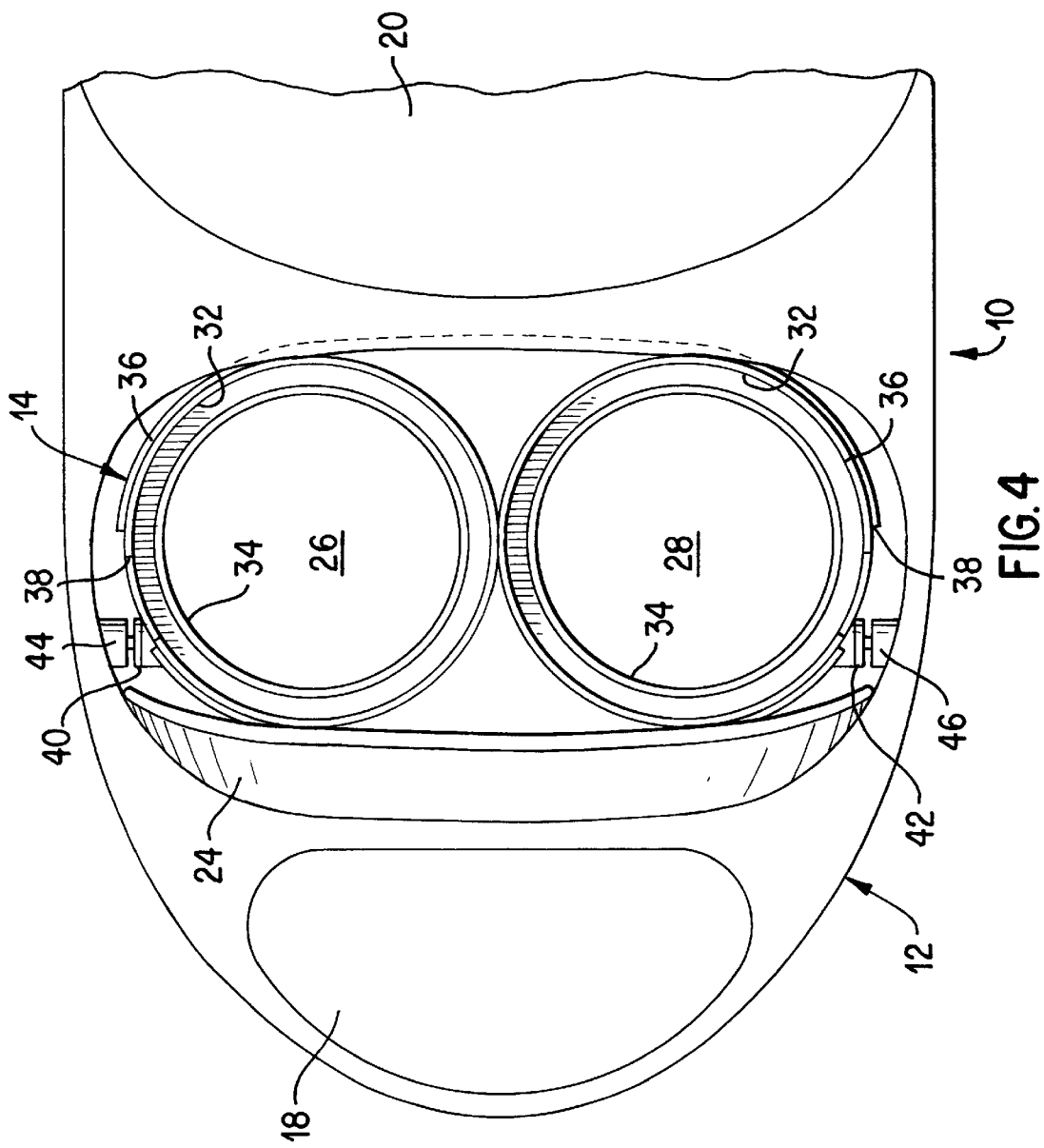
FIG. 4 is a top view of a forward portion of the console of FIG. 1, with the forward cup holder in the open position.

The cup holder 14 is of the disappearing type, and normally resides in a closed position as shown in FIG. 1. When in the closed position, a door 24 attached to and forming a part of the cup holder 14 is generally continuous with the outer surface of the housing 12. Momentary pressing of an upper portion of the door 24 releases a catch assembly inside of the housing 12, permitting the cup holder 14 to be rotated into an open position, as shown in FIG. 2. With the cup holder 14 in the open position, a pair of cup receiving receptacles 26 and 28 are exposed to the outside of the console 10 in preparation for use. The cup holder 14 may be returned to the closed position by pushing on the upper edge of the door 24 to rotate the cup holder 14 back into the closed position shown in FIG. 1. FIGS. 3 and 4 show the cup holder 14 in greater detail.

In accordance with the invention, the cup receptacles 26 and 28, which are arranged in side-by-side fashion, are rigid and continuously fully opened. Unlike many prior art cup holders which require a complicated mechanism to open the cup receptacles as the cup holder is moved into the open or operative position, the cup receptacles 26 and 28 of the cup holder 14 are continuously fully opened at all times. It is only necessary to rotate the cup holder 14 between the closed and open positions, as described hereafter. Preferably, the cup holder is of integral, one-piece construction, and may be molded of plastic or other appropriate material. This adds considerably to the simplicity and low cost of the cup holder 14.

As perhaps best shown in FIG. 3, each of the cup receptacles 26 and 28 is comprised of a stepped opening 30 in the cup holder 14. The stepped opening 30 includes an upper portion 32 thereof of given diameter which extends into the cup holder 14 by a first distance. At that point, the opening 30 steps down in diameter to a lower connecting portion 34 of smaller diameter. The two different portions 32 and 34 of the stepped opening 30 allow each of the cup receptacles 26 and 28 to accommodate a variety of different cups of different sizes. Cups of smaller diameter reside within the lower portion 34, while cups of larger diameter are accommodated by the larger upper portion 32. The stepped opening 30 has an upper edge 36 of circular configuration. The upper edge 36 is provided with a slot 38 therein in a circumferential portion thereof, for receiving cup handles. When a handled cup such as a coffee cup is placed within either of the cup receptacles 26 and 28, the slot 38 in the upper edge 36 of the stepped opening 30 thereof accommodates the lower portion of the handle, allowing the cup to be securely seated within the receptacle 26 or 28. Without the slot 38, the bottom of the cup handle rests on the upper edge 36, so that the cup cannot be securely seated within the cup receptacles 26 or 28.

The door 24 of the cup holder 14 is a thin member which is shaped so as to form a continuation of the outer surface of the housing 12 when the cup holder 14 is in the closed position. As shown in FIG. 3, the door 24 is attached to a front portion of the cup holder 14 so as to form a part thereof. The door 24 also forms a limit stop for the cup holder 14 when in the open position, as described hereafter.

As shown in FIG. 4, the cup holder 14 has pivot lugs 40 and 42 at opposite sides thereof for receiving pins 44 and 46 respectively. The pins 44 and 46 are mounted at the inside of the housing 12, and permit the cup holder 14 to be rotated between the closed and open positions. The pivot lug 42 is also shown in FIGS. 3, 5 and 6.

Figure 5:
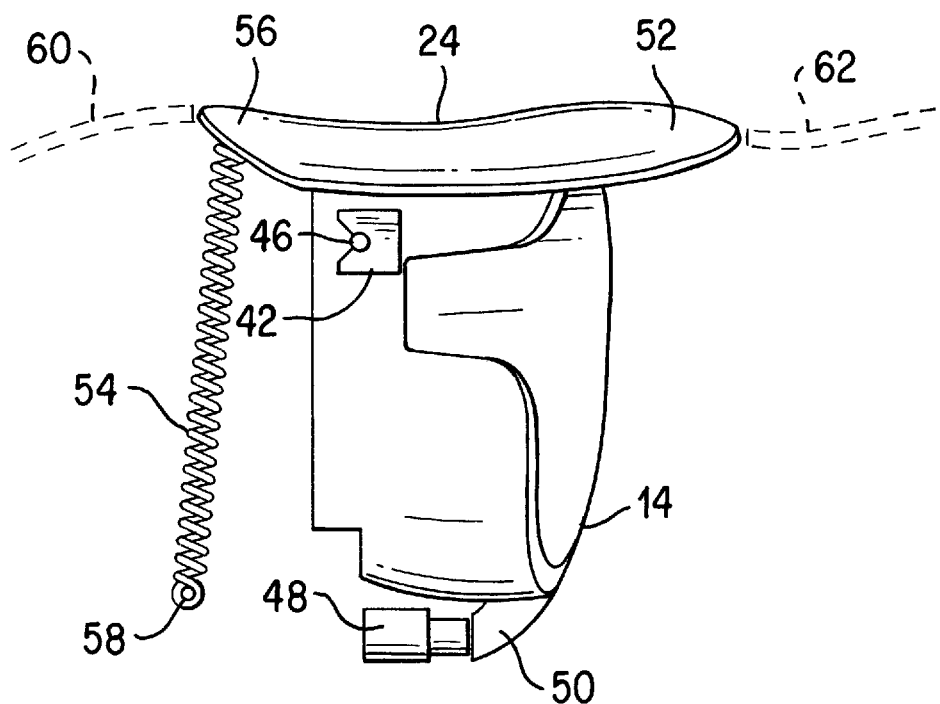
FIG. 5 is an end view of the forward cup holder of the console of FIG. 1, showing the manner in which the door coupled to the cup holder is generally continuous with the outer surface of the console housing when in the closed position.
Figure 6:
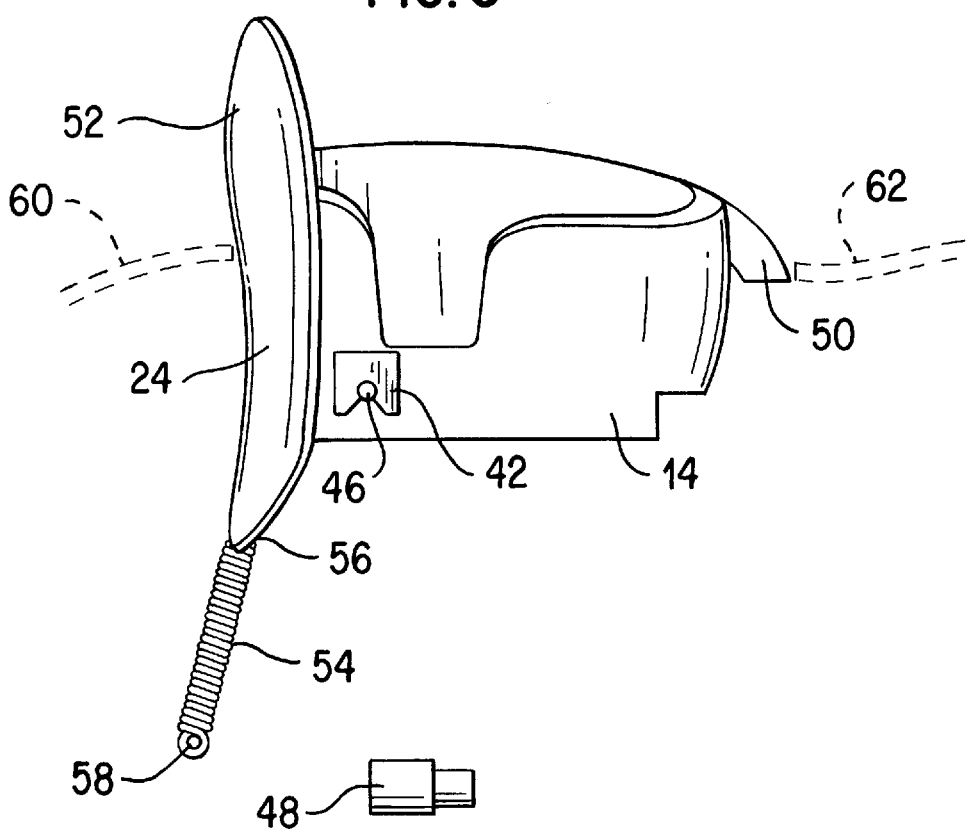
FIG. 6 is an end view of the forward cup holder of the console of FIG. 1, showing the manner in which the door coupled to the cup holder and an extending portion of a releasable catch assembly for the cup holder form limit stops when the cup holder is in the open position.

FIG. 5 shows the cup holder 14 in the closed position, where the cup holder 14 is held by a releasable catch assembly 48 mounted on the inside of the housing 12. The catch assembly 48 includes an extending portion 50 which extends from the back of the cup holder 14 so as to engage the catch assembly 48. The catch assembly 48 may comprise any one of several different commercially available catches of the type which release when momentarily pressed together. Such catch assemblies include those of the mechanical type in which a plunger on the extending portion 52 is releasably received within a spring loaded mechanism in the catch assembly 48 itself. The catch assembly 48 may also be of the magnetic type in which a magnetic member on the extending portion 50 is releasably magnetically engaged with another magnetic member in the catch assembly 48.

The catch assembly 48 is released by exerting a momentary downward force on the door 24 at an upper portion 52 thereof. This compresses and releases the catch assembly 48, allowing a spring 54 which is coupled between a lower portion 56 of the door 24 and a fixed reference point 58 within the housing 12 to rotate the cup holder 14 into the open position shown in FIG. 6. When in the open position, the door 24 engages an edge 60 of the outer surface of the housing 12 (shown in dotted outline in FIGS. 5 and 6), defining a first limit stop for the cup holder 14. A second limit stop is defined by engagement of the extending portion 50 with an opposite edge 62 of the outer surface of the housing 12. The tension of the spring 54 maintains the cup holder 14 in the open position, against the two limit stops.

When it is desired to close the cup holder 14, a force is applied to the upper portion 52 of the door 24 to rotate the cup holder 14 downwardly against the resistance of the spring 54. Eventually, the extending portion 50 contacts the catch assembly 48, which thereafter holds the cup holder 14 in the closed position against the resilient urging of the spring 54 until once again released by the momentary application of a downwardly directed force on the upper portion 52 of the door 24. When the cup holder 14 is in the closed position, shown in FIG. 5, the door 24 forms a continuation of the outer surface of the housing 12.

Figure 7:
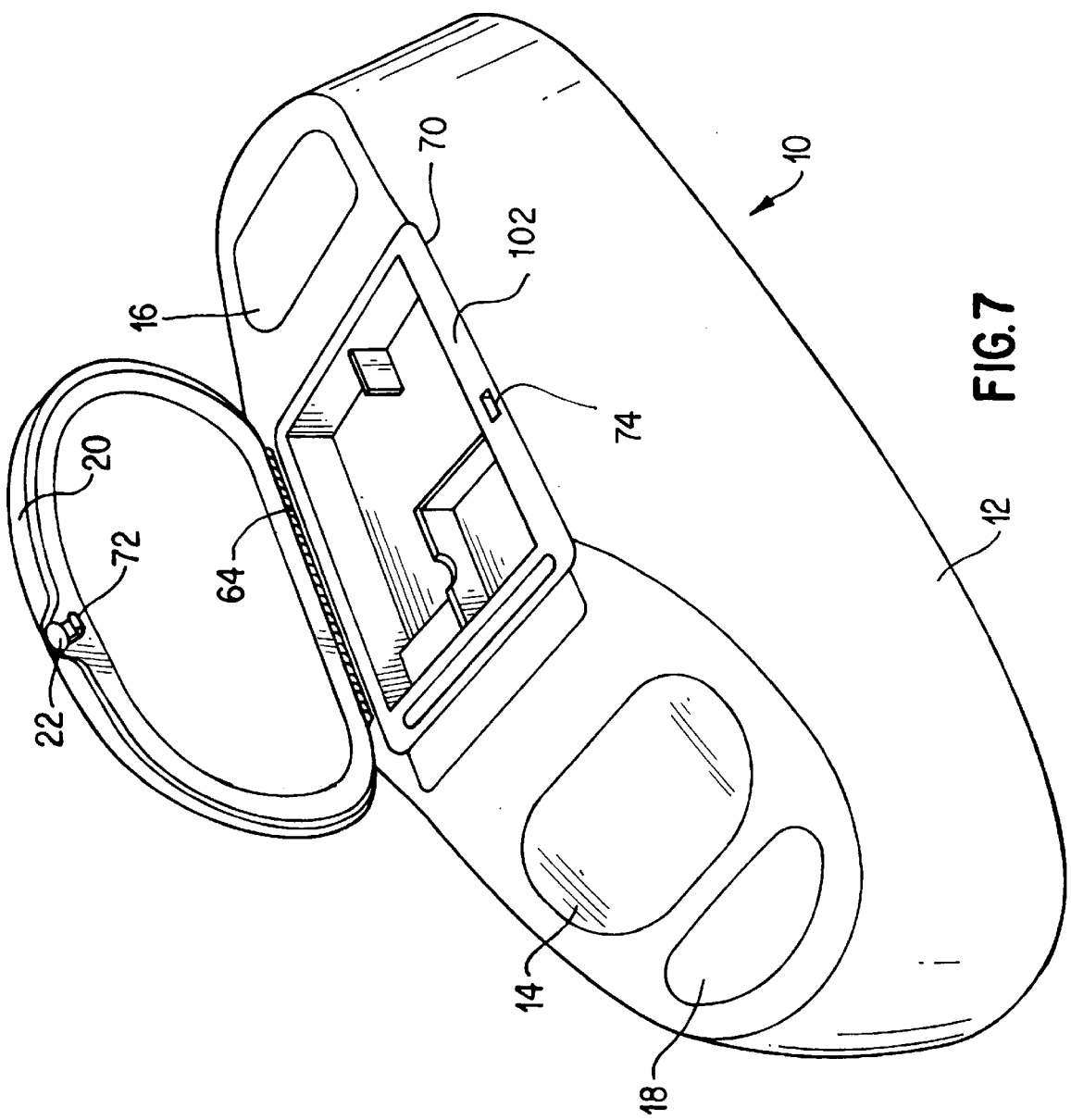
FIG. 7 is a perspective view of the console of FIG. 1 showing a hinged lid at the top of the storage compartment in the open position and released from a hinged storage tray which resides at the top of the storage compartment.
Figure 8:
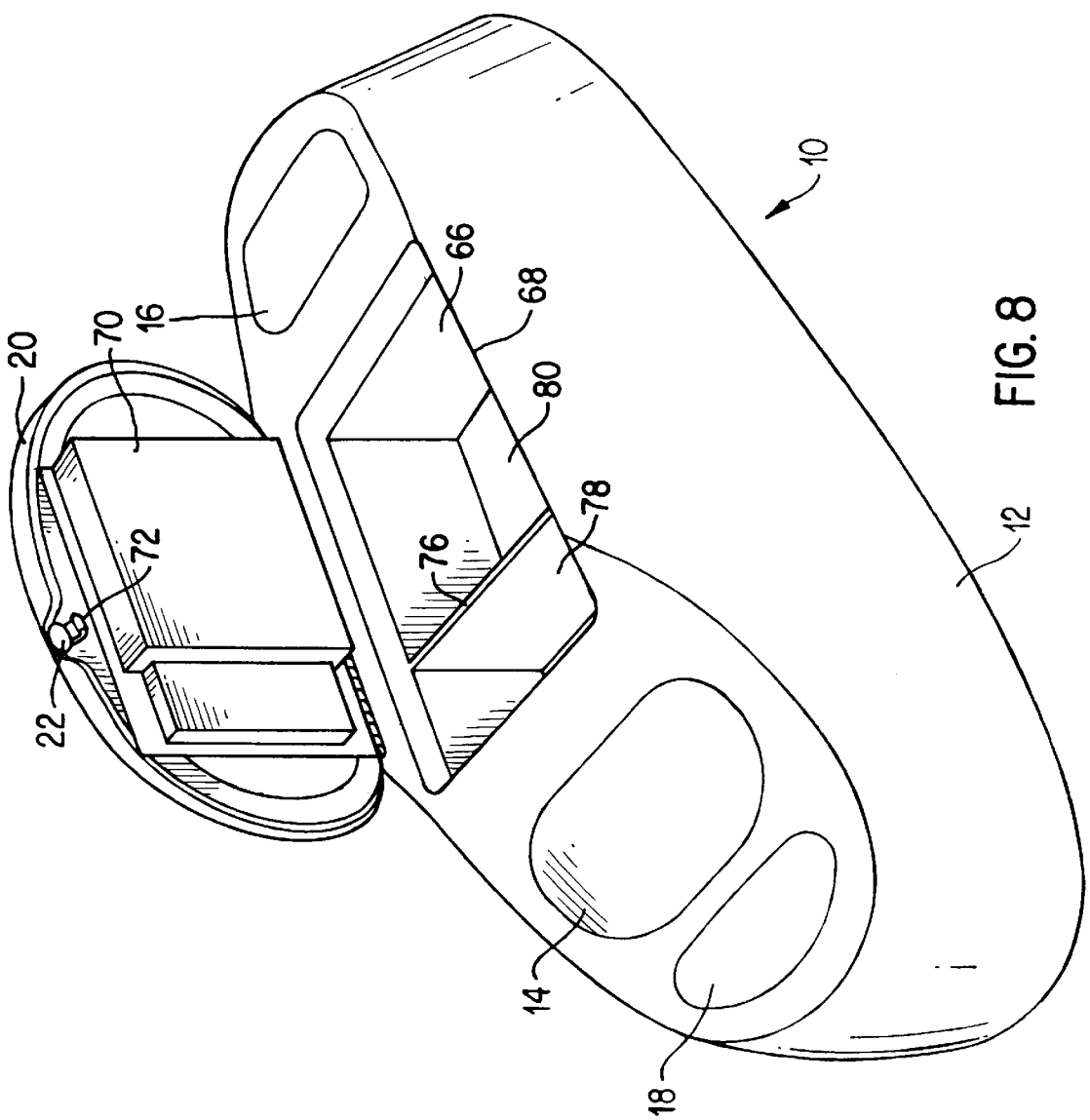
FIG. 8 is a perspective view of the console of FIG. 1 with the hinged lid in the open position and with the storage tray still latched thereto to provide access to the interior of the storage compartment.

FIGS. 7 and 8 show the console 10 with the hinged lid 20 thereof in the raised position. The lid 20 is coupled to an upper edge of the housing 12 by an elongated hinge 64. As previously noted, the housing 12 of the console 10 is provided with a storage compartment in a central portion thereof. The storage compartment 66, which is shown in FIG. 8, is covered at a top 68 thereof by the hinged lid 20. A storage tray 70 is positioned within the top 68 of the storage compartment 66. If the tray release button 22 is pushed before the lid 20 is raised, so as to release the storage tray 70 from the lid 20, then the storage tray 70 remains seated at the top 68 of the storage compartment 66 as the lid 20 is raised. This is shown in FIG. 7, and provides for access to the contents of the storage tray 70. Alternatively, if the tray release button 22 is not pushed as the lid 20 is raised, the storage tray 70 remains attached to the underside of and is raised with the hinged lid 20, to provide access to the storage compartment 66 as shown in FIG. 8. The storage tray 70 is also coupled to the hinge 64 so as to be hinged, as described hereafter.

The ability to selectively raise or leave in place the storage tray 70 provides access to different levels of storage defined by the storage tray 70 and the storage compartment 66. The tray release button 22 extends from a releasable latch 72 mounted on a side edge of the hinged lid 20 opposite the elongated hinge 64. The latch 72 is normally engaged in a latch receiving slot in the storage tray 70, so that lifting of the hinged lid 20 raises the storage tray 70 with it. However, when the tray release button 22 is pressed, the latch 72 disengages from the latch receiving slot 74, allowing the storage tray 70 to remain at the top 68 of the storage compartment 66 as the lid 20 is raised.

As shown in FIG. 8, the storage compartment 66 has a partition 76 therein which extends laterally across the compartment 66 at a forward portion thereof. The partition 76 divides the interior of the storage compartment 66 into a tape and compact disc compartment 68 at a forward end thereof and a larger rear portion 80 thereof which provides a felt lined receptacle for an ice bucket trough.

Figure 9:
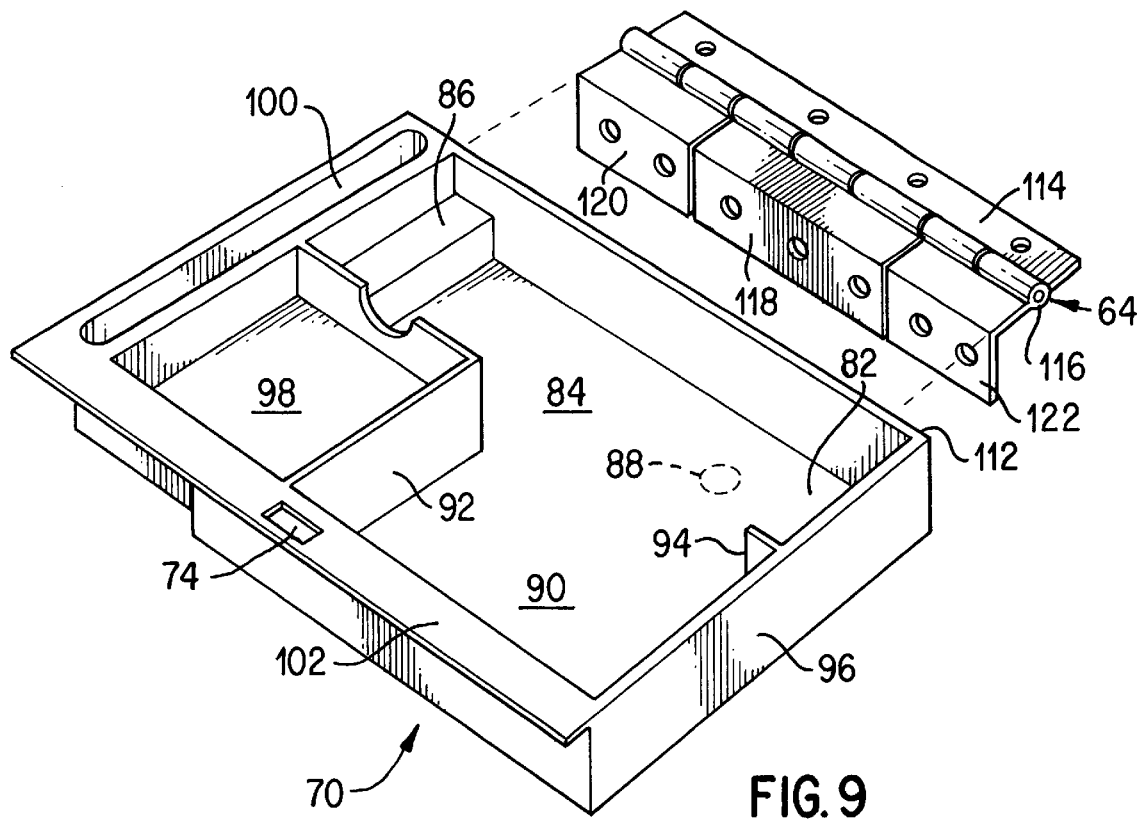
FIG. 9 is a perspective view of the storage tray shown in FIGS. 7 and 8.

The hinged storage tray 70 is shown in detail in FIG. 9. The storage tray 70 is of elongated, rectangular configuration and has a general uniform depth throughout a major portion of an interior 82 thereof. A first side of the interior 82 of the tray 70 defines a cellular phone storage area 84 having a shelf 86 at a forward end thereof for supporting a cellular phone. A knockout plug 88 in a bottom of the tray 70 at an opposite rearward portion of the cellular phone storage area 84 can be removed as necessary to accommodate a cord for a cellular phone to be stored therein. The rear portion of an opposite second side of the interior 82 of the tray 70 defines a tissue box storage area 90. The forward end of the tissue box storage area 90 is defined by a wall 92. A tab 94 extends forwardly from a back wall 96 of the tray 70 to define a limit position for a tissue box stored in the tissue box storage area 90. The wall 92 surrounds a raised area at a forward portion of the second side of the interior 82 of the tray 70, to define a notepad holder 98. An elongated groove extending laterally across the front portion of the tray 70 defines a holder 100 for a writing implement such as a pen or pencil.

Figure 10:
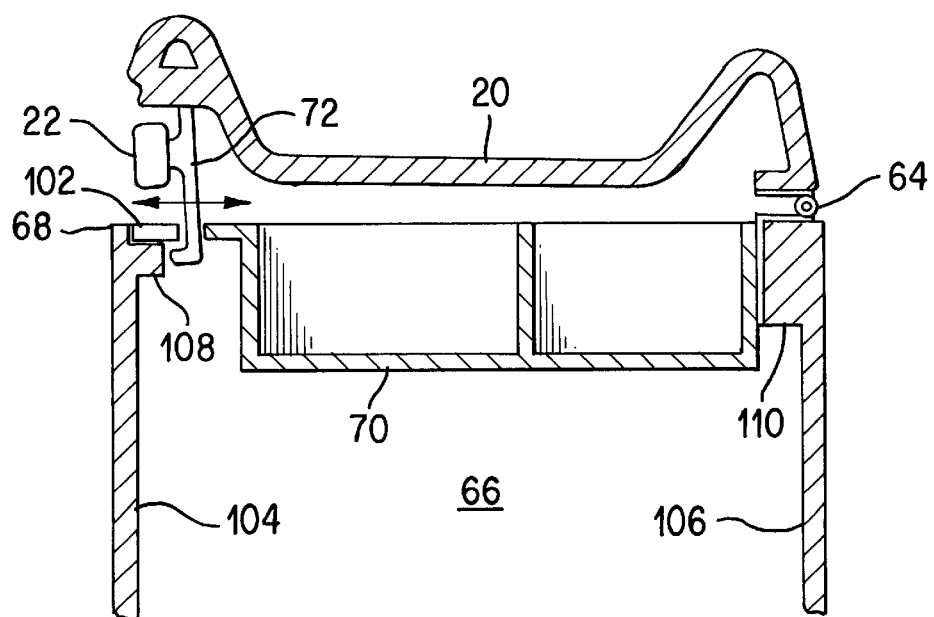
FIG. 10 is a sectional view of a portion of the console of FIG. 1, showing the details of the manner in which the storage tray is seated at the top of the storage compartment and latches to the underside of the hinged lid.

The storage tray 70 has an outwardly extending peripheral lip 102 along a side edge thereof. As shown in FIG. 10, the storage compartment 66 of the console housing 12 has opposite side walls 104 and 106 which respectively terminate in ledges 108 and 110 at the upper ends thereof. The peripheral lip 102 of the tray 70 rests on the ledge 108 when the storage tray 70 is not raised by the lid 20. A side 112 of the tray 70 opposite the peripheral lip 102 is pivotally coupled to the ledge 110 by the hinge 64.

The hinge 64 is shown in detail in FIG. 9, and includes a first side portion 114 thereof which is secured to a side edge of the hinged lid 20. A second side portion on an opposite side of a hinge pin 116 from the first side portion 114 is split so as to form a central portion 118 and opposite end portions 120 and 122. The central portion 118 is attached to the side 112 of the storage tray 70. The end portions 120 and 122 are each attached to the ledge 110 at the upper end of the wall 106. The central portion 118 and the end portions 120 and 122 pivot about the hinge pin 116 independently of each other, permitting the storage tray 70 to be raised relative to the ledge 110. The lid 20 which is attached to the first side portion 114 of the hinge 64 is also free to pivot relative to the ledge 110, either independently of or with the storage tray 70.

The latch receiving slot 74 is formed in the peripheral lip 102 at the side of the storage tray 70. As shown in FIG. 10, the latch 72 normally engages the latch receiving slot 74 in resilient fashion. Consequently, when the hinged lid 20 is raised, the storage tray 70 raises with it and remains attached to the underside of the hinged lid 20, permitting access to the storage compartment 66. On the other hand, when it is desired to provide access to the contents of the storage tray 70, momentary pushing of the tray release button 22 moves the latch 72 laterally against the resilient resistance thereof so that the lower end of the latch 72 can pass up through the latch receiving slot 74 as the hinged lid 20 is raised. This allows the storage tray 70 to remain in position at the top 68 of the storage compartment 66. When the hinged lid 20 is then lowered, the latch 72 extends through and latches in place within the latch receiving slot 74, as the hinged lid 20 reaches the closed position.

While various forms and modifications have been described, it will be appreciated that the invention is not limited thereto but encompasses all expedients and variations falling within the scope of the appended claims.

What is claimed is:

1. An automotive vehicle console comprising the combination of:
   a hollow housing defining the general shape of the console and having a storage compartment therein;
   a hinged lid coupled to the housing above the storage compartment;
   a hinged storage tray mounted at the top of the storage compartment beneath the lid; and
   a cup holder rotatably mounted within the housing forward of the storage compartment and being rotatable between closed and open positions, the cup holder having a plurality of rigid, continuously fully opened cup receptacles therein which are presented at the outside of the housing when the cup holder is in the open position.

2. An automotive vehicle console in accordance with claim 1, wherein the cup holder is of integral, one-piece construction, and further including a releasable latch coupling the storage tray to the lid.

3. An automotive vehicle console comprising the combination of:
   a hollow housing defining the general shape of the console; and
   a cup holder mounted within the housing and being rotatable between closed and open positions, the cup holder having a plurality of rigid, continuously fully opened cup receptacles therein which are presented at the outside of the housing when the cup holder is in the open position.

4. An automotive vehicle console in accordance with claim 3, wherein the cup holder is of integral, one-piece construction.

5. An automotive vehicle console in accordance with claim 3, wherein each of the plurality of cup receptacles comprises a stepped opening of circular configuration in the cup holder and having an upper portion of given diameter and a lower connecting portion of diameter smaller than the given diameter.

6. An automotive vehicle console in accordance with claim 3, wherein each of the plurality of cup receptacles has an upper edge of generally circular configuration with a slot in a portion of a circumference thereof, the slot accommodating the handle of a cup when placed in the cup receptacle.

7. An automotive vehicle console in accordance with claim 3, wherein the housing has an outer surface and the cup holder has a door mounted therein which is generally continuous with the outer surface of the housing when the cup holder is in the closed position.

8. An automotive vehicle console comprising the combination of:
   a hollow housing defining the general shape of the console and having an outer surface;
   a cup holder of integral, one-piece construction having a pair of side-by-side openings therein defining cup receptacles and a pair of pivotable mounts at opposite sides thereof;
   means for pivotably mounting the cup holder within the housing at the pair of pivotable mounts so that the cup holder may be pivoted between closed and open positions, the cup holder having a surface thereof generally continuous with the outer surface of the housing when in the closed position;
   resilient means coupled to the cup holder for resiliently urging the cup holder into the open position; and
   a releasable catch assembly mounted within the housing for holding the cup holder in the closed position against the resilient urging of the resilient means except when released.

9. An automotive vehicle console in accordance with claim 8, wherein the resilient means comprises a spring having a first end coupled to the cup holder and an opposite second end coupled to a fixed location inside the housing.

10. An automotive vehicle console in accordance with claim 8, wherein the cup holder includes a door defining the surface of the cup holder generally continuous with the outer surface of the housing in the closed position, the outer surface of the housing having an edge adjacent the door which is engaged by the door to define a limit stop when the cup holder is in the open position.

11. An automotive vehicle console in accordance with claim 10, wherein the releasable catch assembly is released to allow the cup holder to be resiliently urged into the open position by momentarily pushing inwardly on the door, and includes a portion extending from the cup holder and engaging a second edge of the outer surface of the housing opposite the first-mentioned edge to define a second limit stop when the cup holder is in the open position.

12. A cup holder for use in an automotive vehicle console, the cup holder being of integral, one-piece, molded construction between pivot assemblies at opposite sides thereof for pivoting between closed and open positions and including a plurality of cup receiving openings therein, each having a first portion thereof of given diameter extending into the cup holder from an upper edge to a second portion thereof of diameter smaller than the given diameter, the upper edge having a slot therein in a portion of a circumference thereof to receive a cup handle when placed in the opening.

13. A storage tray for use in an automotive vehicle console, the tray being of elongated, generally rectangular configuration and having an outwardly extending peripheral lip portion at a side thereof for suspending the tray at a top edge of a storage compartment within an automotive vehicle console, the tray having a generally uniform depth within a major portion thereof including a phone storage area along a first side of the tray and a tissue box storage area at a rear portion of second side of the tray opposite the first side and having a tab extending outwardly from a back wall of the tray to define a limit position for a tissue box stored therein, a raised portion at a forward portion of the second side having a wall extending therearound and defining a note pad holder, and an elongated groove extending across a forward portion of the tray defining a writing implement holder.

14. A storage tray in accordance with claim 13, further including a slot in the peripheral lip portion for receiving a latch to releasably attach the tray to the bottom of a hinged lid at the top of the storage compartment.

15. A storage tray in accordance with claim 14, wherein the tray has a shelf at a forward end of the phone storage area for supporting a portion of a phone stored therein and a knockout plug in a bottom thereof within the phone storage area for accommodating a phone cord.

* * * * *

UNITED STATES PATENT AND TRADEMARK OFFICE
CERTIFICATE OF CORRECTION

PATENT NO.    : 5,863,089
DATED         : January 26, 1999
INVENTOR(S)   : Ignarra et al.

It is certified that error appears in the above-identified patent and that said Letters Patent is hereby corrected as shown below:

On the title page, item [73]:

The name of the joint assignee should be added to the name of the Assignee on the face of the patent as follows: --; and TAG - The Accessory Group, Santa Ana, Calif.--.

Signed and Sealed this

Tenth Day of August, 1999

*Attest:*

Q. TODD DICKINSON

*Attesting Officer*   *Acting Commissioner of Patents and Trademarks*